Figure 1:
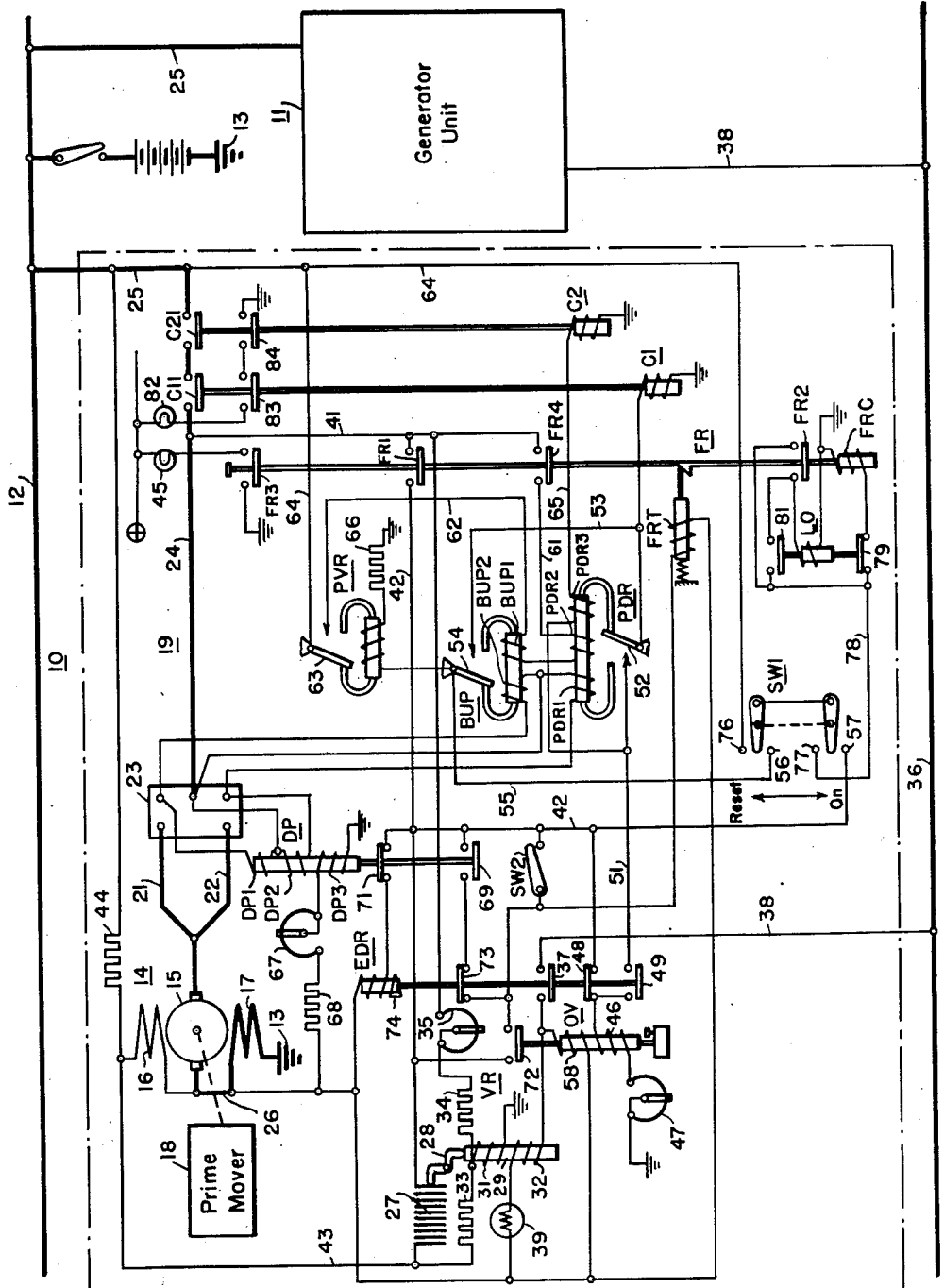

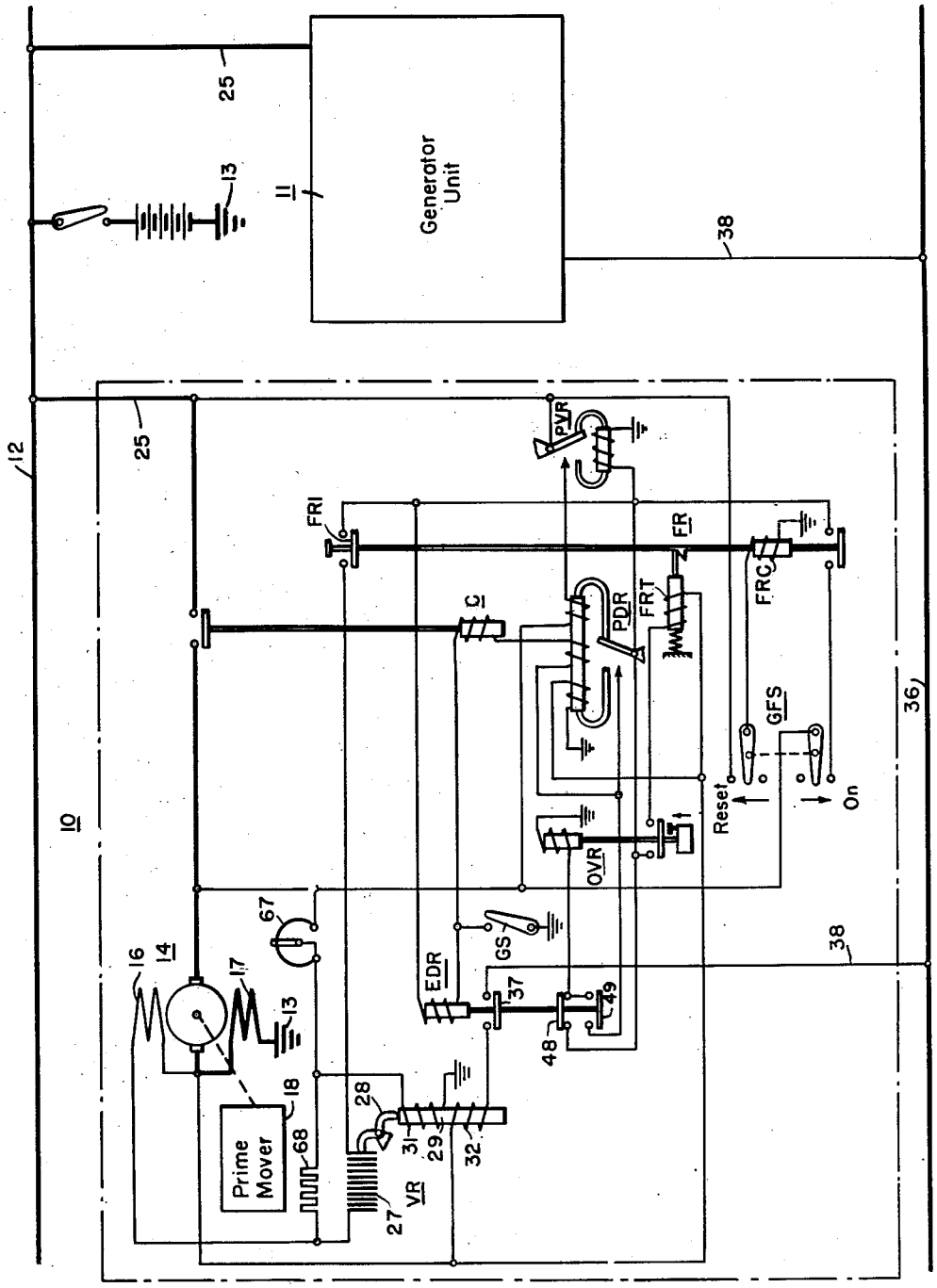

Patented Mar. 25, 1952

2,590,265

UNITED STATES PATENT OFFICE 2,590,265

CONTROL AND PROTECTION OF ELECTRIC POWER SYSTEM

John D. Miner, Jr., Bascum O. Austin, and Ralph D. Jessee, Lima, Ohio, assignors to Westinghouse Electric Corporation, East Pittsburgh, Pa., a corporation of Pennsylvania Application August 12, 1950, Serial No. 179,055

19 Claims. (Cl. 171—119)

Our invention relates, generally, to power systems and, more particularly, to the control of auxiliary power systems for aircraft.

The prevention of over-voltage on aircraft electrical systems is important since over-voltage conditions may result in burning out the instruments, radio devices and the like, upon which safe flight depends. Excessive over-voltage may cause failure of contactors or other circuit interrupting devices with a consequent danger of fire.

Therefore, a relay is usually provided in such systems for protection against over-voltage conditions. In the past it has been necessary to so construct the over-voltage relay that it would protect against sustained over-voltages of the order of 10 to 15 per cent of normal voltage and yet withstand momentary transients of 200 per cent of normal voltage. Such transients may occur, for instance, when the generator field switch is first closed. Even though it is possible to build a relay with sufficient time delay to withstand the transients, such a relay cannot provide adequate selectivity under all load conditions, to effect disconnection of a generator which is causing over-voltage without affecting the normal generators, on a multi-engine airplane with two or more generators.

Furthermore, it has been found that the voltage surges which occur when load is being thrown off and on the system bus or when the generator field winding is being energized and deenergized may cause false operation of the differential protection relay which has one coil connected across the series winding of the generator and is energized by the transient surges through the series winding. These surge voltages occur under overvoltage conditions in all the generators connected in the system, thereby making it difficult to determine the origin of the surges.

An object of our invention is to provide for automatically selecting a generator which is developing an excessive voltage, when two or more generators are operating in parallel.

Another object of our invention is to select the generator which is causing over-voltage, under all load conditions, without affecting the normal generators.

A further object of our invention is to prevent false tripping by the differential protection relays for the generators in a power system because of transient surge voltages in the series windings of the generators.

Still another object of our invention is to provide over-voltage protection for a generator which is disconnected from the load bus of the power system.

A still further object of our invention is to prevent transient conditions in a power system from adversely affecting the operation of protective relays in the system.

Other objects of our invention will be explained fully hereinafter or will be apparent to those skilled in the art.

In practicing our invention, over-voltage selectivity is provided by interconnections of the over-voltage relays with the voltage regulator equalizer circuit and with the reverse-current relays. False tripping by the differential-protection relays is prevented by utilizing the equalizer-disconnect relays to secure a time delay which prevents the tripping of the field relay by momentary operation of a differential-protection relay because of transient surges in the series field winding of a generator. Contact members on the equalizer-disconnect relays are utilized to so connect the over-voltage relays in the system that over-voltage protection is provided for a generator which is disconnected from the load bus.

For a better understanding of the nature and objects of the invention, reference may be had to the following detailed description, taken in conjunction with the accompanying drawings in which:

Figure 1 is a diagrammatic view of a power system embodying the principal features of the invention, and Fig. 2 is a diagrammatic view of a modification of the invention.

Referring to the drawing, and particularly to Fig. 1, the power system shown therein comprises a pair of generator units 10 and 11 which are disposed to be connected in parallel-circuit relation between a power or load bus 12 and ground 13. If desired more than two generator units may be utilized. However, since the generator units are similar in construction and operation, only one unit is shown and described in detail in the present application.

As shown, the unit 10 comprises a direct current generator 14 having an armature winding 15, a shunt field winding 16 and a series field winding 17. The generator 14 may be driven by one of the engines of an airplane or any other suitable prime mover 18.

As described in the copending application of B. O. Austin and R. D. Jessee Serial No. 174,040, filed July 15, 1950, the positive terminal of the generator 14 may be connected to the load bus 12 through a feeder circuit 19 which comprises two parallel connected feeder conductors 21 and 22, a T-connected shunt 23, a conductor 24, contact members C11 and C21 of switches C1 and C2, respectively, and a conductor 25. The negative terminal of the generator 14 may be connected to ground 13 through a conductor 26 and the series field winding 17.

As shown the contact members C11 and C21 of the switches C1 and C2, respectively, are connected in series-circuit relation in the feeder circuit 19. As described in the aforesaid copending application, the operation of the switches C1 and C2 is so controlled by relays provided in the system that the contact members C21 are normally opened first to interrupt the generator circuit and the contact members C11 are opened following the operation of the switch C2, thereby providing backup protection against reverse current in the generator and against failure of the one contactor to open the circuit.

A voltage regulator VR is provided for maintaining a substantially constant generator voltage. The regulator VR controls the energization of the shunt field winding 16 in a manner well known in the art. The regulator VR comprises a carbon pile or stack 27 which is compressed by a solenoid mechanism comprising a lever 28 and a core 29 having an actuating coil 31 and a paralleling coil 32 disposed thereon. Resistors 33 and 34 and a voltage adjusting rheostat 35 are connected in the regulator circuit in the usual manner. The paralleling coil 32 is connected between the negative terminal of the generator 14 and an equalizer bus 36 through contact members 37 of an equalizer disconnect relay EDR and a conductor 38. A ballast lamp 39 may be connected in the circuit for the paralleling coil 32 as shown.

The circuit for the shunt field winding 16 of the generator extends from the feeder conductor 24 through a conductor 41, contact members FR1 of a field relay FR, conductor 42, the carbon pile 27, conductor 43 and the shunt field winding 16 to the negative terminal of the generator. The shunt field winding 16 may be connected to the bus 12 through a tickler resistor 44 to insure correct polarity of the generator 14 at all times.

It will be understood that all of the regulators associated with the several generators connected to the bus are so connected to their respective generators and to the common equalizer bus that the main coils of the regulators function to cause the regulators to maintain the desired generator voltage and the paralleling coils cause the regulators to maintain the desired load division between those generators which are connected to the bus. The equalizer relay EDR opens the equalizer circuit to the regulator for a particular generator when the generator is removed from service or when it is disconnected by operation of the protective relays, as will be explained more fully hereinafter.

As previously described, the circuit for the shunt field winding 16 of the generator is controlled by the contact members FR1 of the field relay FR. As shown, this relay is of a type which is latched in its closed position. The relay is provided with a reset or actuating coil FRC for actuating the relay to its latched position and a trip coil FRT for actuating the tripping mechanism of the relay.

A lockout relay LO and a manually operable switch SW1 are provided for retaining the field relay in its tripped position until it is reset by actuating the reset switch SW1. Thus, it is necessary to reset the relay FR after it has once been tripped before the generator can be put back in operation. An indicating lamp 45, which is energized through contact members FR3 of the relay FR, is provided for indicating when the relay FR is in its closed position.

In addition to controlling the energizing circuit for the field winding 16 of the generator, the relay FR also functions to partially establish the energizing circuit for the actuating coils of the switches C1 and C2 which connect the generator to the load bus 12 as previously explained. Thus, whenever the field relay FR is tripped the generator is disconnected from the load bus and its field circuit is opened.

In order to protect against over-voltage conditions, each generator is provided with an over-voltage relay OV having an actuating coil 46 which is connected to be responsive to the generator voltage. The coil 46 is connected between ground and the positive conductor 42 through an adjustable rheostat 47 and contact members 48 of the relay EDR when the relay EDR is in its deenergized position. When the relay EDR is energized the coil 46 is energized through a circuit which extends through contact members 49 of the relay EDR, conductor 51, contact members 52 of a relay PDR, conductor 53, contact members 54 of a relay BUP, conductor 55, contact members 56 and 57 of the switch SW1, conductor 42, the contact members FR1 of the relay FR and conductor 41 to the feeder conductor 24.

As explained hereinbefore, some scheme must be provided to coordinate the over-voltage relays in the system to insure proper selection of the generator which is producing over-voltage, in order to prevent disconnection of the normal generators, since the voltage of the bus furnishes no direct indication as to which generator is producing over-voltage. In the present system the actuating coil 46 of the relay OV is connected to the generator feeder circuit through the contact members of the reverse current relay PDR as previously described. The relay PDR is so constructed that it is faster in operation than the relay OV, thereby opening its contact members, when an over-voltage condition occurs on the system, before the relay OV operates. Thus, the reverse current relay is utilized as an interlock in the over-voltage relay circuit.

When one generator has a tendency to produce over-voltage under light load conditions it forces reverse current to flow through the other generators connected to the system. Thus, the reverse current relays for the other generators are actuated to open the circuits for the over voltage relays for these generators, thereby preventing operation of these over-voltage relays although the reverse current relays will momentarily disconnect the normal generators from the system. The over-voltage relay for the faulty generator remains connected to its generator and operates to cause that generator to be disconnected from the power system, whereupon the normal generators are immediately reconnected to the system, as described hereinafter. When there is a heavy load on the system, the conditions may be such that even if one generator is attempting to produce over-voltage, no substantial rise in voltage occurs, but the faulty generator takes an increasing share of the load and supplies currents far in excess of its capacity. Under these conditions, the faulty generator must be removed from the system. The present system achieves selectivity and tripping of the faulty generator under these heavy-load conditions by means of biasing coils on the over-voltage relays. The biasing coils are energized from the equalizer circuit and are arranged to decrease the voltage setting of the relay of the faulty generator and increase the setting of the relays of the normal generators.

As shown, the relay OV is provided with a biasing coil 58 which is connected in parallel-circuit relation to the ballast lamp 39 and the paralleling coil 32 of the regular VR. Thus, the coil 58 is responsive to the current in the equalizer circuit for the regulator VR. Likewise, the relays OV of the other generators in the system are provided with similar biasing coils which are connected in a similar manner. The direction of current flow in the equalizer circuit is such that the biasing coil 58 of the over-voltage relay of the faulty generator aids the main coil 46 of the relay and thus, in effect, lowers the voltage setting of the relay so that it operates to effect disconnection of the generator even if there has been no substantial rise in voltage. The biasing coils of the over-voltage relays OV of the normal generators, however, oppose the main coils of the relays and thus, in effect, raise the voltage setting of these relays, so that they are prevented from operating, even though the action of the equalizer circuit tends to raise the voltage of the normal generators during an over-voltage fault.

Each generator in the system is also protected against reverse current flowing through the generator by polarized relays PDR and BUP. The relay PDR is provided with a reverse current coil PDR1 which is connected across a portion of the T-connected shunt 23 and is, therefore, responsive to reverse current flowing through the shunt and the generator 14. The relay is provided with a differential voltage coil PDR2 which is connected between the generator power conductor 24 and the load bus 12 through a circuit which extends from the conductor 24 through conductor 41, contact members FR4 of the relay FR, conductor 61, the coil PDR2, a coil BUP1 of the relay BUP, conductor 62, contact members 63 of a relay PVR, conductor 64 and the conductor 25 to the bus 12. The relay PDR is provided with a holding coil PDR3 which is energized through a circuit extending from the conductor 53 through contact members 52, the coil PDR3, conductor 65 and the coil of the switch C2 to ground. The contact members of the relay PDR are connected in the energizing circuit of the operating coil of the switch C2. The reverse current coil PDR1 is energized in response to the current in the shunt 23, and reversal of the direction of current flow, therefore, reverses the direction of energization of the coil PDR1 and causes it to open the contacts of the relay, thus deenergizing the coil of the switch C2 and effecting disconnection of the generator from the bus.

As explained hereinbefore, the relay BUP functions to control the operation of the switch C1 to provide back-up protection for the generator in case the switch C2 fails to open upon a reversal of generator current. In addition to the coil BUP1 previously mentioned, the relay BUP is provided with another coil BUP2 which is connected across one part of the T-connected shunt 23. The relay BUP may be calibrated to operate on a higher current setting than the relay PDR.

As shown the contact members 54 of the relay BUP are connected in the energizing circuit for both the switch C1 and the switch C2. The contact members of the relay PDR are connected in the circuit for the switch C2 only. The relays are adjusted so that the contact members of the relay PDR open first to cause the switch C2 to open. If the switch C2 fails to open, the contact members of the relay BUP will open, thereby causing the switch C1 to open to disconnect the generator from the load circuit.

In order to provide for connecting the generator 14 to the bus 12 only when its voltage is of proper polarity and magnitude the polarized voltage relay PVR is provided to cooperate with the polarized differential relay PDR in controlling the operation of the switch C2. The coil of the relay PVR is connected between ground and the positive conductor 24 through a resistor 66, the coil of the relay PVR, conductor 55, contact members 56 and 57 of the switch SW1, conductor 42, contact members FR1 of the relay FR and the conductor 41 to the conductor 24. Thus, this relay is responsive to a generator voltage of predetermined magnitude and polarity and the closing of the contact members of this relay is utilized to render the polarized differential relay PDR effective.

As previously explained the relay PDR is provided with the differential voltage coil PDR2 which is connected between the power conductor 24 and the load bus 12 through the contact members of the relay PVR. Thus, the coil PDR2 is energized in accordance with the difference between the voltage of the bus 12 and the generator 14. Accordingly, the contact members of the relay PDR can not close to cause the closing of the switch C2 until the generator voltage is substantially equal to or greater than the voltage of the load bus 12, and of the correct polarity.

In order to protect the system against faults, such as grounds in the generator or the generator leads and the feeder circuit, the T-connected shunt 23 and the differential relay DP are provided. As previously explained, the shunt 23 is connected in the feeder circuit 19 between the generator 14 and the load bus 12. Feeder connections 21 and 22 are connected to two outside terminals of the shunt and the conductor 24 is connected to the middle terminal. The relay DP is provided with a coil DP1 which is connected between one outside terminal and the middle terminal of the shunt 23. Another coil DP2 is connected between the other outside terminal and the middle terminal of the shunt. A third coil DP3 is connected across the series field winding 17 of the generator 14. An adjustable rheostat 67 and a resistor 68 are connected in the circuit for the coil DP3. As described in the aforesaid copending application, the resistor 68 may be utilized to compensate for generator temperature changes.

In this manner the current in the feeder conductor 21 is balanced against the current in the feeder conductor 22 and the sum of these two currents is balanced against the current in the series field winding 17. So long as the respective currents remain equal the relay DP is not operated. A fault in the generator or the generator leads or the feeder conductors will unbalance the currents and cause the relay DP to close its contact members 69 and open its contact members 71.

As explained hereinbefore, it is desirable to prevent transient surges in the generator series field winding from causing false operation of the relay DP to trip the field relay FR. In the present system the relay EDR cooperates with the relay DP to prevent tripping of the field relay by momentary surges.

As shown, the field relay trip coil FRT may be energized through a contact member 72 on the relay OV, or a switch SW2, or through contact members 69 of the relay DP which are connected in series-circuit relation with contact members 73 of the relay EDR. The relay EDR is utilized to secure a time delay which prevents the tripping of the field relay by momentary operation of the differential protection relay DP because of surge voltages from the series winding of the generator. The contact member 71 on the relay DP is connected in series-circuit relation with the actuating coil of the relay EDR. This relay is provided with a short circuited turn 74 for securing a time delay in the operation of the relay. Other well known means of securing a time delay may be utilized if desired.

Operation of the differential protection relay DP opens its contact members 71 and closes its contact members 69. The opening of contact members 71 deenergizes the coil of the relay EDR. Eventually, contact members 73 on the relay EDR will close if the relay DP remains in its uppermost position as a result of a fault and the relay FR will be tripped. However, if the relay DP is only momentarily energized, as the result of a transient surge, the contact members 69 will open before contact members 73 on the relay EDR close, thereby preventing tripping of the field relay FR by transient surges in the series winding of the generator.

As shown, contact members 48 and 49 are provided on the relay EDR to transfer the coil 46 of the relay OV from the circuit through the contact members of the relay PDR directly to the positive conductor 42 whenever the relay EDR is deenergized. In this manner over-voltage protection is provided for a generator which is disconnected from the bus by the operation of its reverse current relay PDR.

As explained hereinbefore, the equalizer disconnect relays EDR of the system function to control the connection of the paralleling coils 32 of the voltage regulators to the equalizer bus 36. The actuating coil of the relay EDR is connected to the positive power conductor 24 when the contact members FR1 of the relay FR are closed. Thus, the coil of the relay EDR is energized by the generator voltage to close its contact members 37 and 49, and the relay is automatically opened when the generator is shut down by the operation of the field relay FR.

The operation of the system may be briefly described as follows. Assuming that the generator 14 is being driven by the prime mover 18, the field relay FR may be closed by operating the switch SW1 first to the "reset" position and then to the "on" position. When the switch SW1 is in the "reset" position, the coil FRC of the relay FR is energized through a circuit which extends from conductor 64 through contact members 76 and 77 of the switch SW1, conductor 78, contact members 79 of the lockout relay LO and the coil FRC to ground. When the relay FR is closed the coil of the relay LO is energized through a circuit which extends from the conductor 78 through contact members FR2 of the relay FR, and the coil of the relay LO to ground. A holding circuit for the relay LO is established through contact members 81 on the relay LO. When the switch SW1 is actuated to the "on" position, the closing coil FRC of the relay FR is deenergized but the relay remains latched in its closed position until the trip coil FRT is energized.

As explained hereinbefore, the closing of the contact members FR1 of the relay FR establishes an energizing circuit for the shunt field winding 13 of the generator 14, thereby permitting the generator voltage to build up. The voltage is controlled by the voltage regulator VR. Closing of the field relay contact FR4 connects the relay coils PDR2 and BUP1 to the conductor 24 and, when the generator voltage is of the proper magnitude and polarity, the relay PVR closes its contact 63 and completes the circuit of the coils PDR2 and BUP1. When the generator voltage is equal to or slightly greater than the bus voltage the contact members of the relays PDR and BUP are closed to complete the energizing circuits for the switches C1 and C2. These circuits extend from the conductor 42 through the contacts 57 and 56 of the switch SW1, conductor 55, contact 54 of relay BUP, and conductor 53 to the coil of the switch C1, and from conductor 53 through the contact 52 of relay PDR, holding coil PDR3 and conductor 65 to the coil of the switch C2. Thus, when the relays PDR and BUP close their contacts, the switches C1 and C2 are closed to connect the generator to the bus 12. A lamp 82 is energized through contact members 83 and 84 on the switches C1 and C2, respectively, thereby indicating that these switches are closed. If reverse current flows from the bus to the generator, for any reason, the relay PDR causes the switch C2 to open to disconnect the generator from the bus, and if the switch C2 fails to open, or fails to interrupt the current, the relay BUP causes the switch C1 to open, thus providing back-up protection. Since operation of the relays PDR and BUP does not trip the field relay FR, the system remains in operative condition and the generator is automatically reconnected to the bus, in the manner previously described, as soon as its voltage again equals or exceeds the bus voltage.

As described hereinbefore, the field relay FR is tripped upon the occurrence of either an over-voltage condition which causes the operation of the relay OV, or a fault in the generator or feeder circuits which causes the operation of the differential relay DP. When this occurs the field relay FR functions not only to interrupt the control circuit for the line switches C1 and C2 but also to interrupt the energizing circuit for the generator field winding 16. This not only disconnects the generator from the bus but also reduces the generator voltage to nearly zero by removing the field excitation. The generator can not be reconnected until after the field relay FR has been reset by operating the switch SW1 in the manner previously described to energize the closing coil FRC of the relay FR.

However, if the generator is disconnected from the bus by the opening of the switch SW1 which causes the opening of the switches C1 and C2, it may be reconnected to the bus by simply actuating this switch to the "on" position without resetting the relay FR which has remained in its closed position. Also, if the generator is at any time disconnected from the bus through the operation of the polarized differential relay PDR in response to a reverse current as previously explained, it will be automatically reconnected to the bus by the relay PDR when the generator again develops sufficient voltage to prevent reverse current from flowing through the generator from the bus 12.

The system shown in Figure 2 is similar to the system shown in Figure 1 and contains some of the basic features described in connection with Figure 1. Transient voltages resulting from closure of the generator field switch GFS have very little effect on the over-voltage relay OVR since the relays PVR and PDR must close before the over-voltage relay is connected in the circuit provided a switch GS is closed to energize the relay EDR. By the time these relays are closed the transient will have passed its peak value, thereby preventing false operation of the relay OVR.

As explained hereinbefore, over-voltage selectivity at light loads is obtained without difficulty. The reverse current relays PDR for all of the generators developing normal voltage operate to prevent operation of their over-voltage relays to cause these generators to be disconnected from the system. The over-voltage relay for the generator which is producing over-voltage functions to disconnect that generator from the system.

It will be understood that an idling generator disconnected from the load bus may generate sufficient voltage to hold in the equalizer relay EDR and as a result of the action of the paralleling coils on the voltage regulators VR the voltage of the entire system may be lowered appreciably. In order to prevent this condition from occurring the switch GS is provided to open the circuits for the equalizer relay EDR and the contactor C which connects the generator to the load bus 12. When the switch GS is opened the present system provides over-voltage protection for the generator and the equalizer relay EDR is disconnected from the system. The coil of the relay OVR remains connected to the generator through contact members 48 on the relay EDR.

From the foregoing description it is apparent that we have provided a power system in which normal operation is completely automatic and requires no attention from the operators. Generators may be switched on and off the system or engines idled without need for any load difference or other adjustments. Protection is provided against transient surges causing false operation of the protective relays and over-voltage selectivity is provided.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system for a plurality of generators each having a field winding and supplying a load bus, in combination, switching means for connecting the generators to the load bus for parallel operation, a voltage regulator for each generator, a paralleling coil on each regulator, equalizer relays for controlling the interconnecting of the paralleling coils, field relays connected to control the energization of the field windings and to control energizing circuits for effecting operation of the switching means for the generators, voltage relays responsive to the generator voltages for controlling the operation of the field relays, and a reverse current relay for each generator cooperating with the equalizer relay for that generator to control the energization of the voltage relay for that generator.

2. In a control system for a plurality of generators each having a field winding and supplying a load bus, in combination, switching means for connecting the generators to the load bus for parallel operation, a voltage regulator for each generator, a paralleling coil on each regulator, equalizer relays for controlling the interconnecting of the paralleling coils, field relays connected to control the energization of the field windings and to control energizing circuits for effecting operation of the switching means for the generators, voltage relays responsive to the generator voltages for controlling the operation of the field relays, a reverse current relay for each generator cooperating with the equalizer relay for that generator to control the energization of the voltage relay for that generator, said reverse current relay also controlling the operation of said switching means for each generator, and said field relay for each generator also controlling the energization of the equalizer relay for each generator.

3. In a control system for a generator having a field winding and supplying a load bus, in combination, switching means for connecting the generator to the load bus, a voltage regulator for the generator, a paralleling coil on the regulator, a field relay connected to control the energization of the field winding and to control an energizing circuit for effecting operation of the switching means, and a voltage relay for controlling the operation of the field relay, said voltage relay having a coil responsive to the generator voltage and an additional coil responsive to the current in the paralleling coil on the regulator.

4. In a control system for a generator having a field winding and supplying a load bus, in combination, switching means for connecting the generator to the load bus, a voltage regulator for the generator, a paralleling coil on the regulator, a field relay connected to control the energization of the field winding and to control an energizing circuit for effecting operation of the switching means, a voltage relay for controlling the operation of the field relay, said voltage relay having a coil responsive to the generator voltage and an additional coil responsive to the current in the paralleling coil on the regulator, and a relay responsive to reverse current in the generator for controlling the energization of the voltage responsive coil on the voltage relay.

5. In a control system for a plurality of generators each having a field winding and supplying a load bus, switch means for connecting the generators to the load bus for parallel operation, a voltage regulator for each generator, a paralleling coil on each regulator, equalizer connections for the paralleling coils, field relays connected to control the energization of the field windings and to control energizing circuits for effecting operation of the switching means for the generator, and voltage relays for controlling the operation of the field relays, each voltage relay having a coil responsive to generator voltage and an additional coil responsive to current in the equalizer connections.

6. In a control system for a plurality of generators each having a field winding and supplying a load bus, in combination, switch means for connecting the generators to the load bus for parallel operation, a voltage regulator for each generator, a paralleling coil on each regulator, equalizer connections for the paralleling coils, field relays connected to control the energization of the field windings and to control energizing circuits for effecting operation of the switching means for the generator, voltage relays for controlling the operation of the field relays, each voltage relay having a coil responsive to generator voltage and an additional coil responsive to current in the equalizer connections, and relay responsive to reverse current in the generator for controlling the energization of the voltage responsive coils on the voltage relays.

7. In a control system for a plurality of generators each having a field winding and supplying a load bus, in combination, switching means for connecting the generators for parallel operation, a voltage regulator for each generator, equalizing means interconnecting the regulators, a field relay connected to control the energization of the field winding and to control energizing circuits for effecting operation of the switching means for each generator, and a voltage relay for controlling the operation of the field relay for each generator, each voltage relay having a coil responsive to its generator voltage and an additional coil responsive to the current in said equalizing means.

8. In a control system for a generator having a field winding, in combination, a voltage regulator for the generator, a paralleling coil on the regulator, a field relay for controlling the energization of the field winding, and a voltage relay for controlling the operation of the field relay, said voltage relay having a coil energized by the generator voltage and an additional coil energized by the current in the paralleling coil on the regulator.

9. In a control system for a generator having a field winding, in combination, a voltage regulator for the generator, a paralleling coil on the regulator, a field relay for controlling the energization of the field winding, and a voltage relay for controlling the operation of the field relay, said voltage relay being responsive to the generator voltage and to the current in the paralleling coil on the regulator.

10. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, and a voltage relay connected to control the operation of said field relay, said voltage relay having a coil responsive to the generator voltage and a coil responsive to the current in said equalizer circuit.

11. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, an equalizer relay responsive to the generator voltage for controlling the connection of said paralleling coil, a field relay connected to control the circuit of the generator field winding and a circuit for effecting operation of said switch means, and a voltage relay connected to control the operation of said field relay, said voltage relay having a coil responsive to the generator voltage and a coil responsive to the current in said equalizer circuit.

12. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, a reverse current relay connected to effect operation of the switch means in response to current flow from the bus to the generator, and a voltage relay connected to control the operation of the field relay, said voltage relay having a coil connected across the generator voltage by said reverse current relay and a coil responsive to the current in said equalizer circuit.

13. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, a reverse current relay connected to effect operation of the switch means in response to current flow from the bus to the generator, and a voltage relay connected to control the operation of the field relay, said voltage relay having a coil connected across the generator voltage by said reverse current relay and a coil responsive to the current in said equalizer circuit, said reverse current relay being of a type which is faster in operation than the voltage relay.

14. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, an equalizer relay responsive to the generator voltage for controlling the connection of said paralleling coil, a field relay connected to control the circuit of the generator field winding and a circuit for effecting operation of said switch means, a reverse current relay connected to effect operation of the switch means in response to current flow from the bus to the generator and a voltage relay connected to control the operation of said field relay, said voltage relay having a first coil responsive to the generator voltage and a second coil responsive to the current in said equalizer circuit, and said equalizer relay having contacts for connecting the first coil of the voltage relay directly across the generator voltage when the equalizer relay is deenergized and for connecting said coil across the generator voltage through the reverse current relay when the equalizer relay is energized.

15. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, an equalizer relay responsive to the generator voltage for controlling the connection of said paralleling coil, a differential relay responsive to unbalance in the currents on opposite sides of the generator, said differential relay controlling the energization of the equalizer relay, and the equalizer relay and differential relay being connected to complete a circuit for effecting operation of the field relay upon operation of the differential relay and consequent deenergization of the equalizer relay.

16. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, an equalizer relay responsive to the generator voltage for controlling the connection of said paralleling coil, a differential relay responsive to unbalance in the currents on opposite sides of the generator, said differential relay controlling the energization of the equalizer relay, said differential relay having contacts connected to effect deenergization of the equalizer relay and to partially complete a circuit for effecting operation of the field relay upon operation of the differential relay, and the equalizer relay having contacts connected to complete said circuit upon deenergization of the equalizer relay.

17. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, an equalizer relay responsive to the generator voltage for controlling the connection of said paralleling coil, a differential relay responsive to unbalance in the currents on opposite sides of the generator, said differential relay controlling the energization of the equalizer relay, said differential relay having contacts connected to effect deenergization of the equalizer relay and to partially complete a circuit for effecting operation of the field relay upon operation of the differential relay, and the equalizer relay having contacts connected to complete said circuit after a predetermined time delay upon deenergization of the equalizer relay.

18. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, an equalizer relay responsive to the generator voltage for controlling the connection of said paralleling coil, a voltage relay having a coil responsive to the generator voltage and a coil responsive to the current in said equalizer circuit, said voltage relay being connected to effect operation of the field relay in response to generator over-voltage, a differential relay responsive to unbalance in the currents on opposite sides of the generator, said differential relay controlling the energization of the equalizer relay, and the equalizer relay and differential relay being connected to complete a circuit for effecting operation of the field relay upon operation of the differential relay and consequent deenergization of the equalizer relay.

19. A control and protective system for a direct-current generator having a field winding, said system including switch means for connecting the generator to a load bus, a voltage regulator for controlling the current in said field winding, said voltage regulator having a main coil responsive to the generator voltage and a paralleling coil adapted to be connected to an equalizer circuit interconnecting the generator with other generators operating in parallel therewith, a field relay connected to control the circuit of the generator field winding and a circuit for effecting operation of said switch means, an equalizer relay responsive to the generator voltage for controlling the connection of said paralleling coil, a voltage relay having a coil responsive to the generator voltage and a coil responsive to the current in said equalizer circuit, said voltage relay being connected to effect operation of the field relay in response to generator over-voltage, a differential relay responsive to unbalance in the currents on opposite sides of the generator, said differential relay controlling the energization of the equalizer relay, said differential relay having contacts connected to effect deenergization of the equalizer relay and to partially complete a circuit for effecting operation of the field relay upon operation of the differential relay, and the equalizer relay having contacts connected to complete said circuit upon deenergization of the equalizer relay.

JOHN D. MINER, JR.
BASCUM O. AUSTIN.
RALPH D. JESSEE.

REFERENCES CITED

The following references are of record in the file of this patent:

UNITED STATES PATENTS

| Number | Name | Date |
|---|---|---|
| 2,483,117 | Almassy | Sept. 27, 1949 |